April 20, 1926.
G. C. MARTIN
1,581,652
CLUTCH
Original Filed August 5, 1916
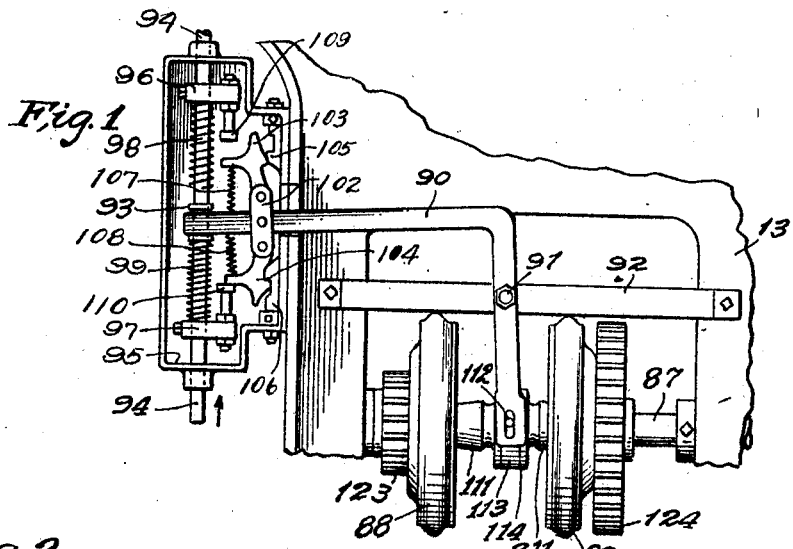
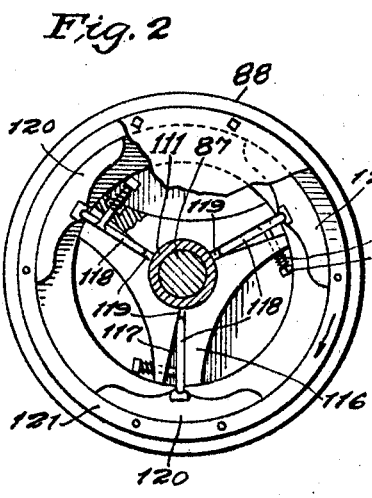
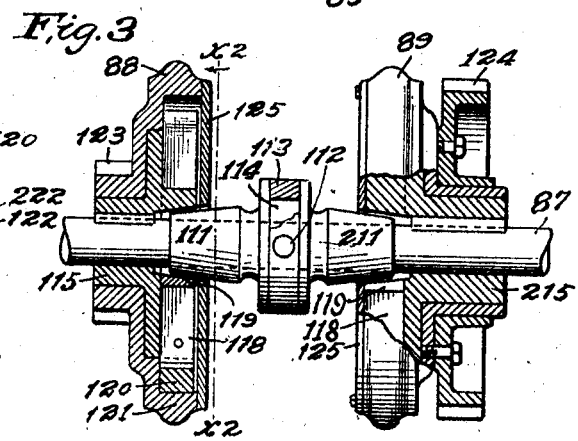
Witness
C. C. Holly
Inventor
George Cushing Martin
by James R. Townsend
his atty Patented Apr. 20, 1926.

1,581,652

UNITED STATES PATENT OFFICE.

GEORGE CUSHING MARTIN, OF LOS ANGELES, CALIFORNIA.

CLUTCH.

Original application filed August 5, 1916, Serial No. 113,360. Divided and this application filed April 18, 1922. Serial No. 552,387.

*To all whom it may concern:*

Be it known that I, GEORGE CUSHING MARTIN, a citizen of the United States, residing at Los Angeles, in the county of Los Angeles and State of California, have invented a new and useful Clutch, of which the following is a specification.

This invention relates to means for connecting and disconnecting a shaft with power transmitting means.

An object of the invention is to make provision for instant, forcible gripping so as to insure positive action and to do this with simple, easily operated means.

A feature of the invention is the arrangement of toggle devices operated by a conical wedge member and adapted to cause forcible frictional engagement between friction shoes and a ring member.

Other objects, advantages and features of invention may appear from the accompanying drawing, the subjoined detail description and the appended claims.

This application is a division of my application Serial No. 113,360, filed August 5, 1916, for concrete pipe machine, renewed July 31, 1920, Serial No. 400,525, patented September 5, 1922, No. 1,428,044.

The accompanying drawing illustrates the invention connected to an operating lever for shifting the same.

Figure 1 is a fragmental elevation of the clutch mechanism disclosed in my co-pending application of which this is a division. Fragments of operating parts connected therewith in the said pipe machine for change of direction and speed are also shown.

Fig. 2 is a fragmental end elevation of one of said clutch devices on a shaft.

Fig. 3 is a fragmental elevation partly in section of the duplicate clutch devices mounted upon a shaft and arranged to transmit power to or from said shaft alternatively, at different speeds and reverse directions.

87 indicates a driven shaft through which power may be transmitted through the medium of appropriate gearing 123 and 124 of different radii; that are operatively connected to a trip rod 94 by means not shown in this application but which is fully shown and described in my Patent No. 1,428,044 hereinbefore stated from which this case was divided.

Said shaft is driven in the direction indicated by an arrow in Fig. 2. Separate friction-clutch mechanism comprising housings 88, 89 are connected to gears 123, 124 respectively, and adapted to revolve therewith.

A lever 90 is pivoted at 91 to a cross bar 92 on standard 13. One end of said lever is oscillated by a sleeve 93 that is mounted on and movable up and down on a trip rod 94 and adapted to be reciprocated to oscillate the lever 90. The other end of said lever 90 is adapted to shift duplicate conical wedge devices or members 111 and 211 which extend respectively into the adjacent clutch devices 88 and 89.

The trip rod 94 is mounted in the frame 95 which is secured to the standard 13; said rod 94 is moved up and down by any suitable mechanism not shown, and carries trip blocks 96, 97 between which and the sleeve 93 are helical springs 98, 99 which surround the trip rod 94. The combined lengths of the sleeve 93 and springs 98, 99 is less than the total distance between the trip blocks 96, 97 so that the upper spring 98 is only active during the latter portion of the upward movement of said rod.

Means are provided to maintain the clutch in proper clutch operating position and comprise a yoke 102 which is secured to the lever 90 and projects a sufficient distance above and below the same to pivotally carry latches 103, 104 that are adapted to engage keepers 105, 106 to alternately hold said lever in its extreme positions. The latches are normally pressed toward the keepers by springs 107, 108 which bear against the outer end of the lever 90 and extend to heel portions formed upon the latches. The trip blocks 96, 97 have adjustable bolts 109, 110 projecting inwardly therefrom and adapted to alternately strike the heels of said latches whereby said latches will be moved against their spring to disconnect them from the keepers. The structure is such that when the trip rod 94 is moved upwardly by any suitable mechanism, not shown, the lower latch will be struck by the bolt 110 and released from its keeper permitting the lever 90 to be raised. The spring 99 will have been compressed against the sleeve 93 before the release of the latch so that when the latch 104 is released, the spring 99 will throw the lever 90 upwardly with a positive action. The upper latch 103 will then engage the keeper 105 and hold the lever in an upward position until the latch 103 is released from its keeper 105 by downward movement of the rod 94.

The lower end of said lever 90 is slotted and engages a pin 112 carried by a sleeve 113 which is loosely mounted in a groove 114 in the central part of a duplex conical wedge device or member 111, 211 so that the lever is adapted to move the wedge device to and fro along the shaft 87.

The friction or clutch mechanisms are preferably provided with a central unit or hub member 115, 215, respectively, each of which is keyed to the shaft 87. The hub member of each clutch mechanism forms a bearing by which its clutch member is mounted on the shaft 87 and said clutch member is provided with a plurality of outwardly extending arms 116 integrally fixed thereto, each of which is formed with an outwardly directed tapered radial recess 117 the walls of which are inclined relative to radial lines extending from the axis of the shaft 87 through the slots. In each of said recesses are mounted toggle members 118, 119, the inner, base, or seat members 119 of which are wedge-shaped so that when in place, the inner edges thereof will conform to the conical wedges 111, 211 which are thrust between and against them.

The outer member 118 of each toggle device is capable of tilting or swaying laterally of the shaft axis and thereby moving at its outer end to an extent limited by the walls of the tapered radial recesses 117, respectively. Said recesses are symmetrically disposed around the shaft. In each is a toggle and its seat member. The toggles are alike and the taper toggle seats are also alike. The outer ends of the toggle members 118 bear against a group of friction devices in the form of shoes 120 which are adapted to engage the inner periphery of an outer ring member 121. Said shoes 120 are preferably adjacent the outer open ends of said recesses and are so made as not to quite conform to the internal circular periphery of the ring member so that when the shoes engage and revolve with the ring member or housing 88, or 89, the toggles will approach a radial position, they will force the center of the shoes outward and said shoes will tightly engage the ring member. The outer members of the toggle devices are normally held out of clutching position by the action of springs 222 which through the bolts 122 move the toggles 118 out of radial position.

The outer ring portions of the clutches may be constantly driven by the gears 123 and 124 which are fixed to the hubs of the clutch members and are adapted to mesh with appropriate gears when the machine is in operation, as will be understood from the drawing.

When one of the wedge cones 111 is forced into the cup or socket of the central unit 115 it pushes outwardly the wedge-shaped members or bases 119 of the toggle devices and tends to push the friction shoes 120 against the periphery of the outer ring 121.

The shoes will then engage and revolve with the ring 121 in the direction of the arrow shown in Fig. 2 and such rotation will hold the toggles in position against the action of said springs 222 on bolts 122, and force the central portions of the shoes 120 outwardly so as to cause said shoes to take firm hold upon the ring 121 and to move therewith. When the conical wedge 111 is withdrawn from the center of the clutch mechanism by the movement of lever 90 it will release the inner wedge-shaped toggle pieces 119 and permit the toggles to tilt in the recesses 117 thus to release the shoes 120 from the ring 121.

When the other conical wedge 211 is forced by the lever 90 into its clutch mechanism, the gear 124 will be driven by said wedge. The two conical wedges are so related to the seats therefor in the clutch devices that only one can be operating its clutch at a time, the other one having been at the same time caused to release its clutch device. The use of the shoes 120 bearing upon the inner frictional surface of the ring member forms a very effective clutch device; one that is quickly and easily operated, and that will instantly take up its work upon the shifting of the cones.

A face plate as at 125 may be arranged upon the inner face of each clutch device so that the parts may be made to run in oil or grease if desired and will be entirely protected from dust, grit or other like materials.

It is thus seen that I have provided a clutch comprising a group of friction devices as the shoes 120, arranged around central supports 111, 211 that have rings 121 in combination with toggle devices 118, 119 for each of said friction devices to engage the shoes and rings as desired; and the parts are constructed and arranged so that when a group of shoes are engaged with their respective ring that rotation of the shaft will aid in holding the parts in clutching engagement to produce maximized pressure of the shoes against the rings; and that such pressure is instantly relieved by withdrawal of the central supporting member.

I claim.

1. The clutch comprising a central member having outwardly tapered recesses; shoes external to said recesses; a ring external to said shoes and adapted to be engaged thereby; toggles normally inclined in said recesses; and means to move said toggles to force the shoes against the ring so that relative rotation of ring and central member will sway the toggles from inclined toward radial positions and vice versa.

2. The combination with a central member having outwardly directed recesses; toggles in the recesses of said member; of shoes adjacent said recesses and engaging said toggles; a ring around said shoes and adapted to be engaged thereby; wedge-like bases for the toggles; a wedge adapted to act upon said bases to force the toggles outward, and an operating lever connected to said wedge and adapted and arranged to move said wedge into and out of engagement with said bases.

In testimony whereof, I have hereunto set my hand at Los Angeles, California, this 8th day of April 1922.

GEORGE CUSHING MARTIN.